Figure 1:
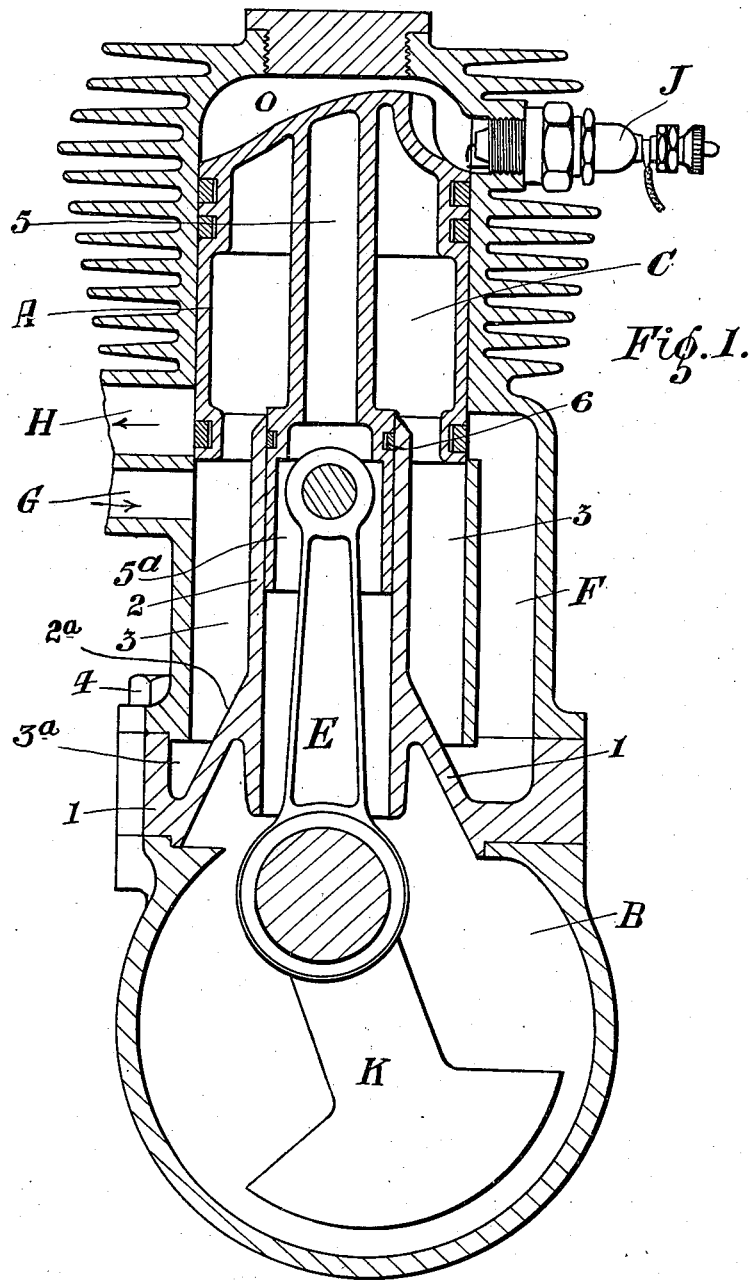

Dec. 21, 1926.  
D. SCOTT  
1,611,283  
INTERNAL COMBUSTION ENGINE  
Filed Feb. 23, 1922     2 Sheets-Sheet 1

Inventor,  
Donald Scott,  
By J.P. Jochum Jr. Atty

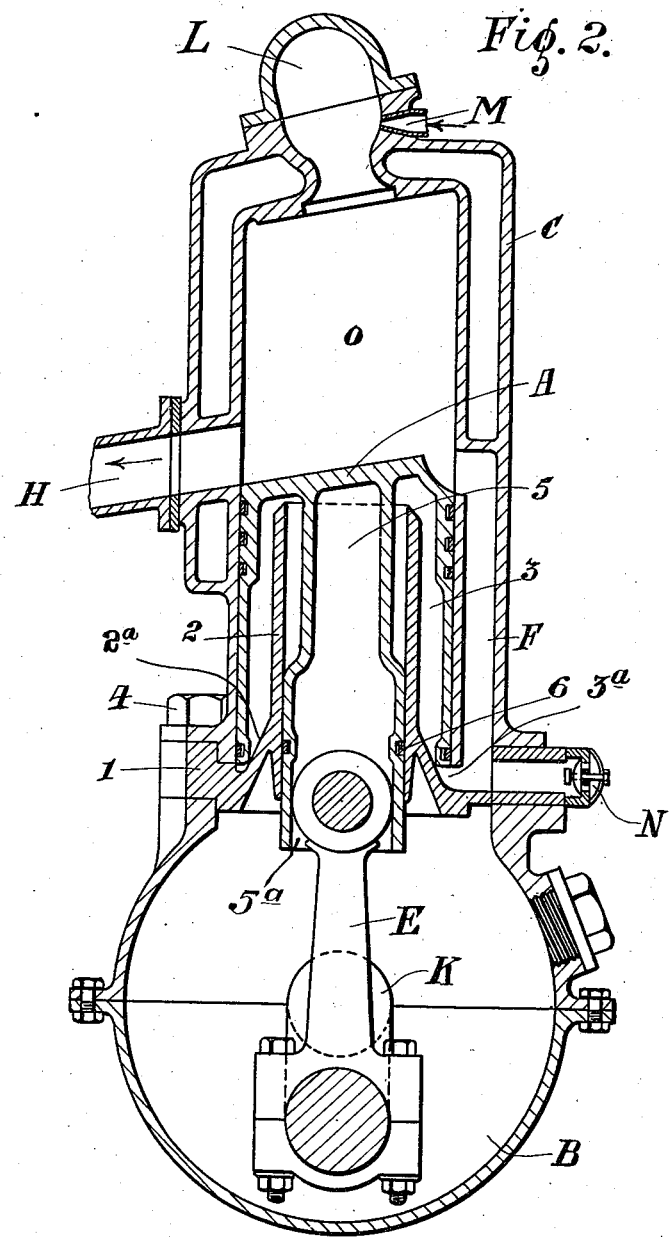

Patented Dec. 21, 1926.

1,611,283

UNITED STATES PATENT OFFICE.

DONALD SCOTT, OF GLASGOW, SCOTLAND, ASSIGNOR TO JOSEPH LEONARD GASKING, OF GLASGOW, SCOTLAND.

INTERNAL-COMBUSTION ENGINE.

Application filed February 23, 1922, Serial No. 538,448, and in Great Britain October 18, 1921.

This invention relates to two-stroke cycle internal combustion engines of the type in which an initial compression space separate from the crank chamber is formed by a member disposed between the crank chamber and the piston, and in which the said member also serves as a guide for the connecting rod.

In order that the invention may be clearly understood and readily carried into effect, it will now be more fully described with reference to the accompanying drawings whereon two constructional forms are illustrated by way of example.

Fig. 1 is a sectional elevation of a single cylinder two-stroke air-cooled engine embodying the features of my invention, and Fig. 2 is a similar view showing the application of the invention to a hot bulb or so called "semi-Diesel" engine.

In carrying out the invention as illustrated in the drawings the engine is equipped with a guide member disposed between the piston A and the crank-chamber B and consisting of a partition 1 having a sleeve or hollow guide 2 considerably less in diameter than the bore of the cylinder C in which it is secured concentrically so as to leave a space 3 isolated from the crank chamber. The guide 2 is provided with an extended outwardly flaring conical flange 2ª adjacent its bottom and a portion of the flange extends into the space 3. The partition 1 is adapted to fit the top of the crankcase and the bottom flange of the cylinder, and is secured by the usual cylinder securing studs or bolts and nuts 4. The hollow piston A has a piston rod 5 which, at its lower end 5ª forms a crosshead for the connecting rod E, being adapted to slide within the guide 2 and carrying a piston ring 6 to form a tight joint between it and the guide. The space 3, which forms the initial compression space for the charge, thus extends into the hollow piston being bounded at the top by the underside of the piston and open at the lower end as at 3ª to the transfer passage F in the cylinder.

Referring now particularly to Fig. 1, G denotes the inlet for the admission of combustible mixture to the initial compression space 3, H the exhaust from the cylinder and J the spark plug. During the reciprocations of the piston the outer wall thereof controls the inlet G, exhaust H, and transfer port F in the ordinary manner of a two stroke engine. As the piston moves downwards on the firing stroke the underside thereof initially compresses the charge of combustible mixture, drawn into the space 3 and the interior of the piston on the previous upstroke, until the transfer port F is uncovered when the mixture rushes into and fills the combustion space O of the cylinder, displacing any remaining gases of combustion through the exhaust port H which is then open. The conical flange 2ª co-operates with the wall of the cylinder at the open bottom of the cylinder and forms therewith a restricted passage through which the charge is forced before the charge enters the passage F, with the result that as the outlet from the cylinder and the entrance of the passage is gradually restricted the initial compression will be facilitated. On the next upstroke the mixture is compressed in the cylinder and a fresh charge is drawn into the space 3. The compression mixture in the combustion space is then ignited by means of the spark plug J and the cycle of operations described is repeated, thereby driving the engine crankshaft K so long as the mixture is admitted to the space 3.

In the hot bulb engine illustrated in Fig. 2, L is the hot bulb, M the fuel sprayer and N an automatic air inlet valve provided in the guide member. With this arrangement atmospheric air drawn through valve N into the space 3 on the upstroke of the piston is initially compressed during the next downstroke or working stroke until the transfer port F is uncovered (as shown in the figure) when it rushes into and fills the combustion space O of the cylinder displacing any residual gases through the open exhaust H. On the next upstroke this air is compressed into the hot bulb, the fuel is injected and the mixture ignited by the heat of the bulb, thereby forcing down the piston and repeating the cycle of operations described and thus driving the crankshaft K.

With both arrangements a higher initial compression is given to the charge in the space 3 than is possible with crankcase compression owing to the greater reduction of the space by displacement of the piston and, consequently, a more effective cylinder charging and scavenging action is obtained which more than outweighs the slightly larger loss of work due to the higher compression, and results in increased efficiency. The incoming charge contacts directly with the piston and cylinder walls whereby a most beneficial exchange of heat occurs. Oblique thrusts on the piston are not transmitted to the cylinder wall but are taken up by the guide member which can be readily and cheaply renewed.

Instead of making the piston rod as shown it may be cruciform in section to present heat transmitting and radiating fins or webs and similar fins or webs may be cast on the inside of the piston.

The guide member may, if desired, form an integral part of the cylinder or of the crankcase, which latter may be of the open type, and the piston rod may be a part separate from the piston and secured thereto in any suitable manner.

Lubrication of the cylinder wall and guide may be effected on the force feed system.

The invention is applicable to existing two-stroke engines working with crankcase compression. In modifying such an engine a guide member as described and illustrated is secured in each cylinder and a new piston or piston rod and preferably a new connecting rod are substituted for those existing. I have found from experience with an engine so modified that a better consumption of fuel is obtained and the efficiency of the engine is increased.

The invention is also applicable, in certain cases, to Diesel engines of the two-stroke type.

Having now fully described my invention what I claim and desire to secure by Letters Patent is:—

An internal combustion engine of the two stroke cycle type comprising in combination, a main cylinder having an open bottom and having a port in its side remote from said open bottom and a transfer passage connecting said open bottom to said port, a piston slidably mounted in said cylinder and adapted to uncover said port, a piston rod in said cylinder, a cross head on the lower end of said piston rod, a crank case, a connecting rod in said crank case attached to said cross head, a hollow guide member arranged so that it is spaced within the walls of the cylinder and of the piston to form an initial compression space between the parts and having an even bore to form a guide for said cross head, an outwardly extending conical flange at the base of said guide member and projecting into the main cylinder at the open lower end thereof for a considerable distance to gradually reduce the diameter of the cylinder at the said end and to form with the wall of the cylinder a restricted outlet communicating with the said transfer passage to assist in sweeping out the compressed gas, the open end of the piston passing over the said conical flange as the piston approaches the end of its stroke, to further gradually reduce the size of the communicating space between the cylinder and the end of the transfer passage, and a radially extending flange on said guide member clamped between the main cylinder and the crank case.

In testimony whereof I affix my signature.

DONALD SCOTT.